(12) United States Patent
Kobayashi et al.

(10) Patent No.: US 7,122,241 B2
(45) Date of Patent: Oct. 17, 2006

(54) BIAXIALLY ORIENTED POLYESTER FILM AND PRODUCTION PROCESS THEREFOR

(75) Inventors: Ieyasu Kobayashi, Sagamihara (JP);
Shinji Muro, Sagamihara (JP);
Hirofumi Murooka, Sagamihara (JP)

(73) Assignee: Teijin Limited, Osaka (JP)

( * ) Notice: Subject to any disclaimer, the term of this patent is extended or adjusted under 35 U.S.C. 154(b) by 6 days.

(21) Appl. No.: 10/942,140

(22) Filed: Sep. 16, 2004

(65) Prior Publication Data
US 2005/0031880 A1    Feb. 10, 2005

Related U.S. Application Data

(62) Division of application No. 10/203,346, filed on Aug. 9, 2002, now Pat. No. 6,890,471.

(51) Int. Cl.
*B32B 15/09*    (2006.01)
*B32B 27/06*    (2006.01)
*B32B 27/36*    (2006.01)

(52) U.S. Cl. .................. 428/141; 428/457; 428/458; 428/480; 428/694 ST; 428/694 SG; 428/910

(58) Field of Classification Search ............ None
See application file for complete search history.

(56) References Cited

U.S. PATENT DOCUMENTS

| | | | | |
|---|---|---|---|---|
| 3,683,060 | A * | 8/1972 | Tanabe et al. ............ 264/235.8 |
| 3,875,119 | A * | 4/1975 | Aoki et al. ................. 528/298 |
| 3,937,754 | A * | 2/1976 | Shimotsuma et al. ........ 525/444 |
| 4,876,137 | A * | 10/1989 | Utsumi ...................... 428/141 |
| 5,051,292 | A * | 9/1991 | Katoh et al. ................ 428/141 |
| 5,419,942 | A * | 5/1995 | Masuda et al. ............. 428/141 |
| 5,534,323 | A * | 7/1996 | Chuujou et al. ......... 428/847.3 |
| 5,935,674 | A * | 8/1999 | Saito et al. .............. 428/847.3 |
| 6,139,952 | A * | 10/2000 | Furuya et al. .............. 428/339 |
| 6,190,753 | B1 * | 2/2001 | Koseki et al. .............. 428/141 |
| 6,197,430 | B1 * | 3/2001 | Asakura et al. .......... 428/847.2 |
| 6,228,461 | B1 * | 5/2001 | Sueki et al. .................. 428/98 |
| 6,562,274 | B1 * | 5/2003 | Asakura et al. .......... 264/290.2 |
| 6,767,610 | B1 * | 7/2004 | Takahashi et al. ....... 428/847.7 |
| 6,770,351 | B1 * | 8/2004 | Kobayashi et al. ...... 428/847.3 |
| 6,773,802 | B1 * | 8/2004 | Kobayashi et al. ...... 428/847.4 |
| 6,835,461 | B1 * | 12/2004 | Yamagata et al. ....... 428/847.2 |
| 6,890,471 | B1 * | 5/2005 | Kobayashi et al. ...... 264/290.2 |
| 2002/0058133 | A1 | 5/2002 | Mueller et al. |
| 2003/0180562 | A1 * | 9/2003 | Kobayashi et al. ......... 428/482 |

FOREIGN PATENT DOCUMENTS

| | | |
|---|---|---|
| EP | 228611 A2 | 7/1987 |
| EP | 0 279 611 A | 8/1988 |

(Continued)

Primary Examiner—Vivian Chen
(74) Attorney, Agent, or Firm—Sughrue Mion, PLLC

(57) ABSTRACT

A biaxially oriented polyester film for a high-density magnetic recording medium, particularly a high-density magnetic recoding medium of linear recording system, which has high strength in longitudinal and transverse directions, excellent dimensional stability in a crosswise direction and is flat and excellent in output characteristics and a process for producing the same. The biaxially oriented film is made from polyethylene-2,6-naphthalate and has a Young's modulus in a longitudinal direction of 8 GPa or more, a Young's modulus in a transverse direction of 6 GPa or more, a temperature expansion coefficient in the transverse direction ($\alpha t$) of $-5\times10^{-6}$/° C. to $+12\times10^{-6}$/° C., a humidity expansion coefficient in the transverse direction ($\alpha h$) of $5\times10^{-6}$/% RH to $12\times10^{-6}$/% RH and a thermal shrinkage factor in the transverse direction at 105° C. of $-0.5$ to $+1.5$%.

11 Claims, 1 Drawing Sheet

FOREIGN PATENT DOCUMENTS

| | | |
|---|---|---|
| EP | 532172 A1 | 3/1993 |
| EP | 593773 A1 | 4/1994 |
| EP | 611789 A1 | 8/1994 |
| EP | 659809 A2 | 6/1995 |
| EP | 951991 A1 | 10/1999 |
| EP | 1069553 A1 | 1/2001 |
| EP | 1120225 A1 | 8/2001 |
| JP | 59-12730 A | 7/1984 |
| JP | 62-241129 A | 10/1987 |
| JP | 63-113931 A | 5/1988 |
| JP | 63-288725 * | 11/1988 |
| JP | 03-219425 * | 9/1991 |
| JP | 5-117420 A | 5/1993 |
| JP | 5-212786 A | 8/1993 |
| JP | 05-212787 * | 8/1993 |
| JP | 05-230196 * | 9/1993 |
| JP | 7-314551 A | 12/1995 |
| JP | 11-279293 A | 10/1999 |
| JP | 2000-43216 A | 2/2000 |
| JP | 2000-302892 A | 10/2000 |

* cited by examiner

BIAXIALLY ORIENTED POLYESTER FILM AND PRODUCTION PROCESS THEREFOR

This is a divisional of application Ser. No. 10/203,346 filed Aug. 9, 2002, now U.S. Pat. No. 6,890,471.

FIELD OF THE INVENTION

The present invention relates to a biaxially oriented polyester film and a production process therefor. More specifically, it relates to a biaxially oriented polyester film which has excellent dimensional stability while retaining high Young's moduli and is therefore useful as a base film for high-density magnetic recording media, particularly LTO and S-DLT magnetic tapes of linear recording system, and a production process therefor.

DESCRIPTION OF THE PRIOR ART

A polyester film is used in a wide variety of fields such as magnetic recording media and electrical insulation as it has excellent thermal and mechanical properties. As the capacity and density of a magnetic recording medium, particularly a data storage tape have been increasing in recent years, requirements for a base film for use in the medium have been becoming higher and higher.

In order to ensure a large capacity for a tape, it is conceivable to reduce the thickness, extend the length, flatten the magnetic side or increase the linear recording density or the number of tracks of the tape. A base film having higher flatness, higher strength and excellent dimensional stability in a crosswise direction is desired.

Heretofore, a polyethylene terephthalate film has been widely used as a base film for magnetic tapes but a polyethylene-2,6-naphthalene dicarboxylate film having high strength and high dimensional stability has recently been used very often. However, when the strength in the longitudinal direction of the film is to be increased, the strength in the transverse direction lowers, resulting in deteriorated dimensional stability in the crosswise direction. Also, when the strength in the transverse direction is to be increased to improve dimensional stability in the transverse direction, the strength in the longitudinal direction lowers. Thus, a biaxially oriented polyethylene-2,6-naphthalene dicarboxylate film which has excellent dimensional stability while retaining high Young's moduli in both longitudinal and transverse directions is yet to be provided.

SUMMARY OF THE INVENTION

It is an object of the present invention to provide a biaxially oriented polyester film which solves the above problem, has high strength in both longitudinal and transverse directions and excellent dimensional stability in the crosswise direction and comprises ethylene-2,6-naphthalene dicarboxylate as the main recurring unit.

It is another object of the present invention to provide a flat biaxially oriented polyester film which is useful as a base film for high-density magnetic recording media having excellent output characteristics, particularly high-density magnetic recording media of linear recording system.

It is still another object of the present invention to provide an industrially advantageous process for producing a biaxially oriented polyester film having the above excellent properties of the present invention.

Other objects and advantages of the present invention will become apparent from the following description.

According to the present invention, firstly, the above objects and advantages of the present invention are attained by a process for producing a biaxially oriented polyester film, comprising the steps of:

(1) stretching an unstretched film of a polyester which comprises ethylene-2,6-naphthalene dicarboxylate in an amount of at least 95 mol % of the total of all the recurring units to 4.5 to 7.0 times in a machine direction at a temperature of 100 to 190° C. to form a uniaxially oriented film; and (2) stretching this uniaxially oriented film to 4.0 to 7.0 times in a transverse direction at a temperature of 110 to 170° C. while raising the temperature in the traveling direction of the film and then stretching the film to 1.05 to 1.5 times at a lower draw rate than the first draw rate at a temperature from the final temperature of the first transverse orientation to 240° C. while raising the temperature in the traveling direction of the film to form a biaxially oriented film having (i) a Young's modulus in the longitudinal direction of 8 GPa or more, (ii) a Young's modulus in the transverse direction of 6 GPa or more, (iii) a temperature expansion coefficient in the transverse direction ($\alpha t$) of $-5 \times 10^{-6}/°$ C. to $+12 \times 10^{-6}/°$ C., (iv) a humidity expansion coefficient in the transverse direction ($\alpha h$) of $+5 \times 10^{-6}$/% RH to $+12 \times 10^{-6}$/% RH, and (v) a thermal shrinkage factor at 105° C. in the transverse direction of $-0.5$ to $+1.5\%$.

According to the present invention, secondly, the above objects and advantages of the present invention are attained by a biaxially oriented polyester film which has (i) a Young's modulus in a longitudinal direction of 8 to 12 GPa, (ii) a Young's modulus in a transverse direction of 6.5 to 9 GPa, (iii) a temperature expansion coefficient in the transverse direction ($\alpha t$) of $-5 \times 10^{-6}/°$ C. to $+12 \times 10^{-6}/°$ C., (iv) a humidity expansion coefficient in the transverse direction ($\alpha h$) of $+6 \times 10^{-6}$/% RH to $+12 \times 10^{-6}$/% RH and (v) a thermal shrinkage factor at 105° C. in the transverse direction of 0 to $+1.5\%$ and which comprises (vi) ethylene-2,6-naphthalene dicarboxylate in an amount of at least 95 mol % of the total of all the recurring units.

DETAILED DESCRIPTION OF THE PREFERRED EMBODIMENT

Figure 1:
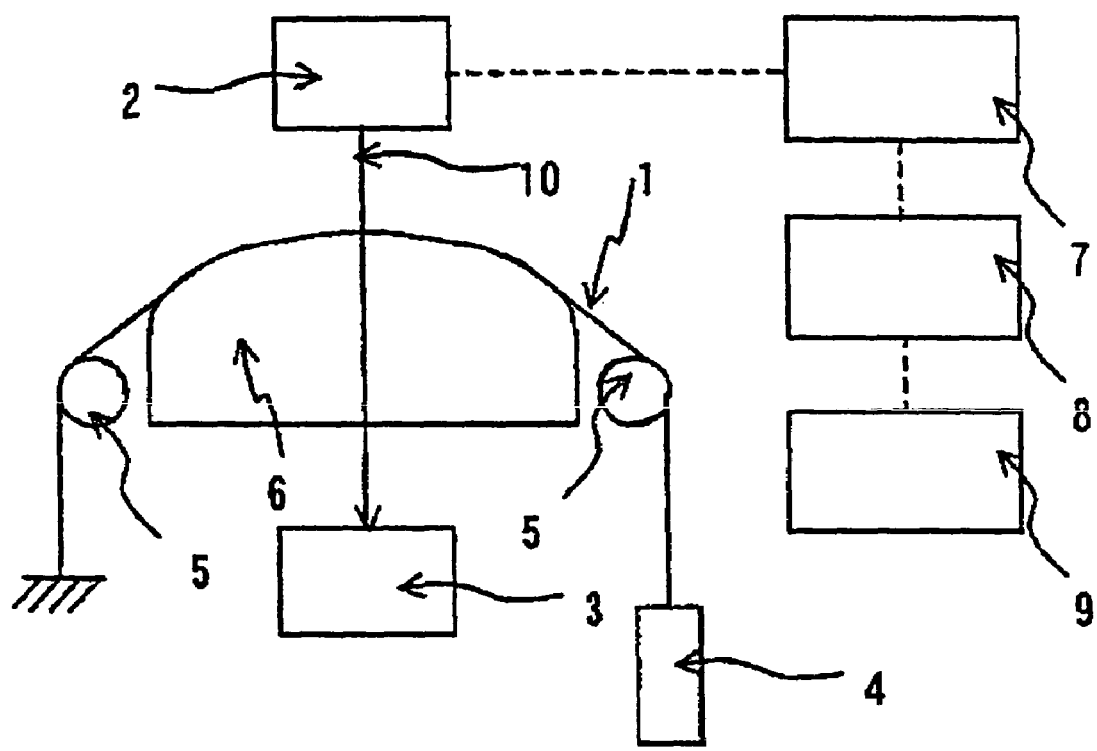
FIG. 1 is a schematic diagram of a device for measuring a dimensional change in a crosswise direction under load in a longitudinal direction.

The present invention will be described in detail hereinbelow. A description is first given of the production process. As described above, the process of the present invention comprises the steps of stretching a film in a machine (longitudinal) direction and then stretching the film in a transverse direction in two stages, the draw rate of the second-stage transverse orientation being lower than the draw rate of the first-stage transverse orientation.

The unstretched film to be uniaxially stretched in the step (1) is made from a polyester which comprises ethylene-2,6-naphtahlene dicarboxylate in an amount of at least 95 mol % of the total of all the recurring units. The polyester is particularly preferably a homopolymer of ethylene-2,6-naphthalene dicarboxylate.

The polyester can be produced by a method known per se. For example, it can be produced by carrying out an ester exchange reaction between a lower alkyl ester of 2,6-naphthalenedicarboxylic acid and ethylene glycol and polycondensing the reaction product. The ester exchange reaction catalyst used for the ester exchange reaction is preferably a manganese compound, and the manganese compound is preferably an oxide, chloride, carbonate or carboxylate, particularly preferably manganese acetate. When the ester exchange reaction is substantially completed, a phosphorus compound is preferably added to deactivate the ester exchange catalyst. The phosphorus compound is preferably trimethyl phosphate, triethyl phosphate, tri-n-butyl phosphate or orthophosphoric acid, particularly preferably trimethyl phosphate. The polycondensation catalyst is preferably an antimony compound, particularly preferably antimony trioxide.

The intrinsic viscosity of the thus obtained polyester is preferably 0.40 (dl/g) or more, more preferably 0.40 to 0.90. When the intrinsic viscosity is less than 0.4, the film often breaks in the stretching step. When the intrinsic viscosity is more than 0.9, the polymerization productivity of the polyester tends to lower disadvantageously. After melt polymerization, the polyester may be chipped and solid-phase polymerized under vacuum heating or in a stream of an inert gas such as nitrogen.

Various additives may be added to the above polyester used in the present invention in limits not prejudicial to the object of the present invention. Particularly addition of inert fine particles is desired to adjust the surface roughness of the obtained biaxially oriented polyester film to a suitable range. Addition of the inert fine particles will be described hereinafter.

In the step (1), the unstretched film of the above polyester is stretched to 4.5 to 7.0 times in the machine direction at a temperature of 100 to 190° C. to form a uniaxially oriented film. When the draw ratio stretching in machine direction is lower than 4.5 times, the Young's modulus in the longitudinal direction of the finally obtained biaxially oriented film tends to fall below 8 GPa and when the draw ratio stretching in machine direction is higher than 7.0 times, the film is easily broken by stretching in the transverse direction in the subsequent step (2), thereby making it difficult to adjust the Young's modulus in the transverse direction of the finally obtained biaxially oriented film to 6 GPa or more.

The temperature for stretching in machine direction of the step (1) is preferably 120 to 170° C. and the draw ratio is preferably 5.0 to 6.5 times.

The uniaxially oriented film obtained in the step (1) has a refractive index in the longitudinal direction (NMD) of 1.77 or more, a refractive index in the transverse direction (NTD) of 1.55 to 1.62, preferably 1.57 to 1.60, and a refractive index in the thickness direction (NTD) of preferably 1.50 to 1.56, particularly preferably 1.52 to 1.56. When the refractive indices of the uniaxially oriented film are outside the above ranges, the film is often broken by stretching in the transverse direction in the subsequent step, or a biaxially oriented film having the targeted Young's moduli is hardly obtained.

In the step (2), the uniaxially oriented film is first stretched to 3.0 to 6.0 times in the transverse direction at 110 to 170° C. while the temperature is raised in the traveling direction of the film, namely, the temperature of the film is raised in the traveling direction of the film (first transverse stretching). When the above draw ratio in the transverse direction is lower than 3 times, a biaxially oriented film having the targeted Young's modulus in the transverse direction is hardly obtained and when the draw ratio is higher than 6 times, the film is often broken, resulting in greatly deteriorated film forming properties.

The temperature of the first transverse orientation in the step (2) is preferably 130 to 160° C. and the draw ratio is preferably 4.0 to 5.0 times. As for the elevation of the temperature in the traveling direction of the film for the first transverse stretching, the gradient of a temperature rise is preferably in the range of 15 to 55° C., more preferably 20 to 50° C. during the first transverse orientation.

In the step (2), the first transverse stretching is followed by further stretching the film to 1.05 to 1.5 times in the transverse direction at a lower draw rate than the draw rate of the first transverse stretching at a temperature from the same temperature as the final temperature of the first transverse stretching to 240° C. while raising the temperature in the traveling direction of the film (second transverse stretching). When the draw ratio of the second transverse stretching is lower than 1.05 times, the draw ratio of the previous transverse stretching must be made excessively high to obtain the targeted Young's modulus in the transverse direction of the finally obtained biaxially oriented film. In this case, the film is readily broken by the previous transverse stretching. When the draw ratio of the second transverse stretching is higher than 1.5 times, the thermal shrinkage factor in the transverse direction of the obtained biaxially oriented film becomes too large disadvantageously.

The temperature of the second transverse stretching is preferably from the same temperature as the final temperature of the first transverse stretching to 220° C. and the draw ratio is preferably 1.05 to 1.2 times.

As for the elevation of the temperature in the traveling direction of the film for the second transverse stretching, the gradient of a temperature rise is preferably in the range of 20 to 90° C., more preferably 25 to 85° C. during the second transverse orientation.

The draw rate of the second transverse stretching is lower than the draw rate of the first transverse stretching which is 10 to 300%/sec, for example, 0.1 to 30%/sec. The ratio of the draw rate of the first transverse stretching to the draw rate of the second transverse stretching is preferably 0.005 to 0.5, more preferably 0.01 to 0.3, much more preferably 0.01 to 0.1.

In the process of the present invention, after the second transverse stretching, it is preferred to further carry out the step of shrinking or stretching the film to 0.9 to 1.05 times in the transverse direction at the same temperature as the final temperature of the second transverse orientation or at a temperature of 170 to 230° C. while reducing the temperature from the final temperature in the traveling direction of the film. When the temperature of this step, that is, heat setting or crystallization step is lower than 170° C., the thermal shrinkage factor in the transverse direction of the film at 105° C. becomes too large and may exceed 1.5%. When the temperature is higher than 230° C., the temperature and humidity expansion coefficients become large and the dimensional stability in the crosswise direction is deteriorated by temperature and humidity variations. As for a dimensional change in the crosswise direction caused by final heat setting, when the toe-out (elongation) is more than 10%, the thermal shrinkage factor becomes large, thereby deteriorating dimensional stability in the crosswise direction and when the toe-in (shrinkage) is more than 5%, the Young's modulus in the transverse direction of the film is suddenly lowered by this heat setting, thereby making it difficult to obtain the required Young's modulus in the transverse direction. The total area draw ratio is preferably 20 to 50 times, more preferably 25 to 45 times, particularly preferably 30 to 40 times.

As described above, by the process of the present invention, a biaxially stretched (oriented) film having (i) a Young's modulus in the longitudinal direction of 8 GPa or more, (ii) a Young's modulus in the transverse direction of 6 GPa or more, (iii) a temperature expansion coefficient in the transverse direction ($\alpha t$) of $-5 \times 10^{-6}/°$ C. to $+12 \times 10^{-6}/°$ C., (iv) a humidity expansion coefficient in the transverse direction ($\alpha h$) of $+5 \times 10^{-6}$/% RH to $+12 \times 10^{-6}$/% RH, and (v) a thermal shrinkage factor at 105° C. in the transverse direction of $-0.5$ to $+1.5\%$ is formed.

The above biaxially oriented film is characterized in that its Young's modulus in the longitudinal direction, Young's modulus in the transverse direction, temperature expansion coefficient in the transverse direction ($\alpha t$), humidity expansion coefficient in the transverse direction ($\alpha h$) and thermal shrinkage factor at 105° C. in the transverse direction are within the respective specific ranges.

This biaxially oriented film has a Young's modulus in the longitudinal direction of the film of 8 GPa or more and a Young's modulus in the transverse direction of the film of 6 GPa or more. When the Young's modulus in the longitudinal direction is lower than 8 GPa and strong stress is applied to a magnetic tape, the tape elongates in the longitudinal direction and deforms disadvantageously. When the film is used in a magnetic recording medium of linear recording system having a high track density, the medium shrinks in the crosswise direction by its elongation in the lengthwise direction, thereby causing track dislocation. The Young's modulus in the longitudinal direction is preferably 8.5 GPa or more, more preferably 9 GPa or more.

When the Young's modulus in the transverse direction of the film is lower than 6 GPa, the temperature and humidity expansion coefficients in the transverse direction become large, whereby when it is used in a magnetic recording medium of linear recording system having a high track density, the film shrinks or elongates in the crosswise direction by temperature and humidity variations, thereby causing track dislocation, or when a thin tape (base thickness of 3 to 7 μm) is caused to run repeatedly, the end portion of the tape is damaged and deforms into a seaweed-like shape or is bent by contacting to a guide for restricting the transverse direction of the tape in an extreme case, thereby greatly impairing the characteristic properties of the tape. The Young's modulus in the transverse direction of the film is preferably 6.5 GPa or more, more preferably 7 GPa or more.

Although the Young's moduli in both longitudinal and transverse directions are desirably high, when the film is used in a magnetic recording medium of linear recording system, the Young's modulus in the longitudinal direction is preferably higher than the Young's modulus in the transverse direction. This is because it is more important to prevent the tape from being deformed or broken by a load as a base film for a high-density magnetic recording medium is thin.

The above biaxially oriented film has a temperature expansion coefficient in the transverse direction ($\alpha t$) of $-5 \times 10^{-6}/°$ C. to $+12 \times 10^{-6}/°$ C., a humidity expansion coefficient in the transverse direction ($\alpha h$) of $5 \times 10^{-6}$/% RH to $12 \times 10^{-6}$/% RH and a thermal shrinkage factor at 105° C. in the transverse direction of $-0.5$ to $+1.5\%$. When the temperature expansion coefficient or the humidity expansion coefficient in the transverse direction is larger than the above range and the film is used in a magnetic recording medium of linear recording system having a high track density, the dimensional change in a crosswise direction caused by temperature and humidity variations becomes large, thereby causing track dislocation and making it impossible to read data. When the temperature expansion coefficient or the humidity expansion coefficient in the transverse direction is smaller than the above range, since the Young's modulus in the transverse direction becomes high, it is difficult to retain a high Young's modulus in the longitudinal direction. Therefore, when strong stress is applied to the magnetic tape, the tape elongates and deforms disadvantageously. The thermal shrinkage factor at 105° C. in the transverse direction is preferably $-0.5$ to $+1.0\%$, particularly preferably $-0.5$ to $+0.7\%$. When the thermal shrinkage factor at 105° C. in the transverse direction is outside the above range, in the step of forming a magnetic tape, the elasticity of the film becomes large, whereby the film may be wrinkled, coating may become nonuniform, or the film may not be calendered well in the calendering step. When a magnetic tape is formed from the film, the tape shrinks or elongates in the crosswise direction by a temperature rise in the drive, thereby causing track dislocation and making it impossible to read data.

The above biaxially oriented film has a refractive index in the thickness direction (Nz) of preferably less than 1.490, more preferably less than 1.487, much more preferably less than 1.485, particularly preferably less than 1.483. When Nz is more than 1.490, surface orientation becomes low and it is difficult to achieve high Young's moduli in both longitudinal and transverse directions.

The magnetic layer forming side of the above biaxially oriented film is preferably flat to obtain excellent electromagnetic conversion characteristics. The surface roughness (WRa) of at least one side of the film is preferably 0.5 to 10 nm, more preferably 0.8 to 7 nm, particularly preferably 1 to 5 nm. When this surface roughness WRa is higher than 10 nm, it is difficult to maintain electromagnetic conversion characteristics required for a magnetic tape. When the surface roughness WRa is lower than 0.5 nm, the friction coefficient becomes too large, thereby making it extremely difficult to cause the film to run and roll the film. The side opposite to the magnetic layer forming side, that is, non-magnetic layer side of the above biaxially oriented film has a surface roughness of 1 to 20 nm, more preferably 2 to 15 nm, particularly preferably 2 to 12 nm to obtain excellent running properties. When the surface roughness of the non-magnetic layer side is lower than 1 nm, the winding properties and transfer properties of the film during the production and processing of the film are poor, thereby making it difficult to use it. When the surface roughness of the non-magnetic layer side is higher than 20 nm, the flatness of the magnetic layer side may be impaired, thereby deteriorating electromagnetic conversion characteristics.

In order to obtain surfaces which differ from each other in surface roughness, for instance, two layers which differ from each other in the average particle diameter and amount of inert fine particles to be added to form fine irregularities on the surface of the film may be laminated together, or a different coating layer may be formed on one side or both sides of the film. As a matter of course, if the surface roughnesses of the magnetic layer side and the non-magnetic layer side fall within the above respective ranges, the surface roughness of the magnetic layer side may be made equal to the surface roughness of the non-magnetic layer side. In this case, a single-layer film can be easily produced.

A biaxially oriented film consisting of two layers is obtained by using an unstretched laminated film consisting of two layers as the unstretched film to be stretched in the longitudinal direction in the step (1) of the above production process of the present invention.

The inert particles to be added to the film layer on which the magnetic layer is to be formed have an average particle diameter of preferably 0.05 to 0.7 μm, more preferably 0.1 to 0.3 μm, particularly preferably 0.1 to 0.2 μm. The amount of the inert particles is preferably 0.001 to 1 wt %, more preferably 0.005 to 0.5 wt %, particularly preferably 0.01 to 0.2 wt %. When the average particle diameter of the inert particles is smaller than 0.05 μm or the amount thereof is smaller than 0.001 wt %, winding properties or transfer properties in the processing step deteriorate. When the average particle diameter is larger than 0.5 μm or the amount is larger than 1 wt %, electromagnetic conversion characteristics worsen.

Examples of the inert particles to be added to the film layer on the magnetic layer side include (1) heat resistant polymer particles (particles of at least one of crosslinked silicone resin, crosslinked polystyrene, crosslinked acrylic resin, melamine-formaldehyde resin, aromatic polyamide resin, polyimide resin, polyamide-imide resin, crosslinked polyesters, etc.), and fine particles of inorganic compounds such as (2) metal oxides (aluminum oxide, titanium dioxide, silicon dioxide (silica), magnesium oxide, zinc oxide, zirconium oxide, etc.), (3) metal carbonates (magnesium carbonate, calcium carbonate, etc.), (4) metal sulfates (calcium sulfate, barium sulfate, etc.), (5) carbon (carbon black, graphite, diamond, etc.), and (6) clay minerals (kaolin, clay, bentonite, etc.). Out of these, preferred are crosslinked silicone resin particles, crosslinked polystyrene resin particles, melamine-formaldehyde resin particles, polyamide-imide resin particles, aluminum oxide (alumina) particles, titanium dioxide particles, silicon dioxide particles, zirconium oxide particles, synthesized calcium carbonate particles, barium sulfate particles, diamond particles and kaolin particles. More preferred are crosslinked silicone resin particles, crosslinked polystyrene resin particles, aluminum oxide (alumina) particles, titanium dioxide particles, silicon dioxide particles and calcium carbonate particles. The above inert particles may be used alone or in combination of two or more.

The inert particles to be contained in the film layer on the non-magnetic layer side have an average particle diameter of preferably 0.05 to 1.0 μm, more preferably 0.1 to 0.7 μm, particularly preferably 0.1 to 0.6 μm. The amount of the inert particles is preferably 0.01 to 2 wt %, more preferably 0.1 to 1 wt %, particularly preferably 0.1 to 0.5 wt %. When the average particle diameter is smaller than 0.05 μm or the amount is smaller than 0.01 wt %, slipperiness becomes unsatisfactory and winding properties and handling properties in the processing step become worse. When the average particle diameter is larger than 1.0 μm or the amount is larger than 2 wt %, the magnetic side becomes rough because the flat layer is thrust up by a lubricant contained in the rough layer by calendering or the like, or the surface properties of the running side are transferred to the magnetic side at the time of curing, thereby causing an error. The above inert particles may be used alone or in combination of two or more. As for the type of the inert particles, the same type of inert particles as those added to the magnetic layer side are preferred.

The thickness of the above biaxially oriented film is preferably 2 to 10 μm, more preferably 3 to 7 μm, particularly preferably 4 to 6 μm. When the thickness is larger than 10 μm, the length of the obtained magnetic tape wound round a cassette becomes short, thereby making it difficult to increase the capacity of the tape. When the thickness of the film is smaller than 2 μm, force applied at the time of starting and stopping the magnetic tape causes the permanent elongation of the film, thereby making it difficult to obtain satisfactory durability. As for the thickness ratio of the magnetic layer to the non-magnetic layer in the case of a laminated film, the thickness of the non-magnetic layer is preferably ⅔ or less, more preferably ½ or less, particularly preferably ⅓ or less of the total thickness of the laminated biaxially oriented polyester film.

Out of the above biaxially oriented films produced by the process of the present invention, the biaxially oriented film of the present invention is particularly excellent in physical properties as described below.

The biaxially oriented polyester film has (i) a Young's modulus in the longitudinal direction of 8 to 12 GPa, (ii) a Young's modulus in the transverse direction of 6.5 to 9 GPa, (iii) a temperature expansion coefficient in the transverse direction ($\alpha t$) of $-5 \times 10^{-6}$/° C. to $+12 \times 10^{-6}$/° C., (iv) a humidity expansion coefficient in the transverse direction ($\alpha h$) of $+5 \times 10^{-6}$/% RH to $+12 \times 10^{-6}$/% RH, and (v) a thermal shrinkage factor at 105° C. in the transverse direction of 0 to +1.5% and comprises ethylene-2,6-naphthalene dicarboxylate in an amount of at least 95 mol % of the total of all the recurring units.

The total of Young's moduli in longitudinal and transverse directions is preferably 15 to 20 GPa.

A film having a higher Young's modulus in the longitudinal direction than a Young's modulus in the transverse direction is preferred.

A film having a refractive index in the thickness direction (Nz) of less than 1.490 is preferred.

Further, a film having a center plane average roughness (WRa) of at least one side of 0.5 to 10 nm is preferred.

When the above biaxially oriented polyester film of the present invention is a laminated film, the laminate preferably consists of two adjacent layers made from a polyester comprising ethylene-2,6-naphthalene dicarboxylate in an amount of at least 95 mol % of the total of all the recurring units and has a center plane average roughness (WRa) of one side of 0.5 to 10 nm and a WRa of the other side of 1 to 20 nm.

The biaxially oriented film of the present invention can be changed into a metal coated magnetic recording medium for high-density recording which has excellent electromagnetic conversion characteristics such as output at a short-wavelength range, S/N and C/N, few drop outs and a low error rate by applying a coating solution prepared by uniformly dispersing iron or needle-like fine magnetic powders (metal powders) containing iron as the main component into a binder such as polyvinyl chloride or vinyl chloride-vinyl acetate copolymer to the surface having a lower surface roughness (magnetic layer side) to form a magnetic layer having a thickness of preferably 1 μm or less, more preferably 0.1 to 1 μm, and optionally further forming a back coat layer on the opposite side by a known method. A non-magnetic layer may also be formed on the surface on the magnetic layer side of the film as a layer underlying the above metal powder-containing magnetic layer by applying a coating solution prepared by dispersing fine titanium oxide particles or the like in the same organic binder as that of the magnetic layer.

The thus obtained metal coated magnetic recording medium can be used as a large-capacity computer tape, particularly an LTO, DLT or Super-DLT magnetic tape of linear recording system, for a magnetic tape which has excellent running properties, durability, dimensional stability and electromagnetic conversion characteristics. In the biaxially oriented film of the present invention, a metal thin film as a magnetic layer can be used in place of the coating film. In this case, a deposited magnetic recording medium for high-density recording which has excellent electromagnetic conversion characteristics such as output at a short-wavelength range, S/N and C/N, few drop outs and a low error rate can be obtained by forming a ferromagnetic metal thin film layer of iron, cobalt, chromium or an alloy or oxide essentially composed thereof on the side having a lower surface roughness by vacuum vapor deposition, sputtering, ion plating or the like, forming a protective layer of diamond-like carbon (DLC) or the like and a fluorine-containing carboxylic acid-based lubricant layer on the surface of the ferromagnetic metal thin film layer sequentially according to purpose or application, and forming a back coat layer on the opposite side (non-magnetic layer) by the above method.

EXAMPLES

The following examples are provided to further illustrate the present invention. Various physical properties and characteristic properties in the present invention were measured and defined as follows.

(1) Young's Modulus

The film is cut to a width of 10 mm and a length of 150 mm, this obtained sample is pulled by an Instron type universal tensile tester at a chuck interval of 100 mm, a pull rate of 10 mm/min and a chart rate of 500 mm/min, and the Young's modulus is calculated from the tangent of a rising portion of the obtained load-elongation curve.

(2) Surface Roughness (WRa)

Using the non-contact 3-D roughness meter (NT-2000) of WYKO Co., Ltd., the surface roughness of the film is measured for 10 or more times (n) under such conditions as a measurement area of 246.6 μm×187.5 μm (0.0462 mm$^2$) and a measurement magnification of ×25, and the center plane average roughness (WRa) is obtained with surface analysis software incorporated in the roughness meter.

$$WRa = \sum_{k=1}^{m}\sum_{j=1}^{n}|Z_{jk} - \overline{Z}|/(m \cdot n)$$

$$\text{provided } \overline{Z} = \sum_{k=1}^{m}\sum_{j=1}^{n}Z_{jk}/(m \cdot n)$$

wherein $Z_{jk}$ is a height on a 2-D roughness chart at a j-th position and a k-th position in a measurement direction (246.6 μm) and a direction perpendicular to the measurement direction (187.5 μm) when these directions are divided into m and n sections, respectively.

(3) Temperature Expansion Coefficient (αt)

The film sample is cut to a length of 15 mm and a width of 5 mm in the transverse direction of the film, and the obtained sample is set in the TMA3000 of Shinku Riko Co., Ltd. to be pre-treated at 60° C. in a nitrogen atmosphere for 30 minutes and cooled to room temperature. Thereafter, the temperature is raised from 25° C. to 70° C. at a rate of 2° C./min and the length of the sample is measured at each temperature to calculate the temperature expansion coefficient (αt) of the film from the following equation.

$$\alpha t = \{(L_2-L_1)/(L_0 \times \Delta T)\} \times 10^6 + 0.5 \text{ (note)}$$

wherein $L_1$ is the length (mm) of the sample at 40° C., $L_2$ is the length (mm) of the sample at 60° C., $L_0$ is the initial length (mm) of the sample, and ΔT is 60−40=20 (° C.).

(Note): temperature expansion coefficient of quartz glass (×10$^6$)

(4) Humidity Expansion Coefficient (αh)

The film sample is cut to a length of 15 mm and a width of 5 mm in the transverse direction of the film, and the obtained sample is set in the TMA3000 of Shinku Riko Co., Ltd. and maintained at a humidity of 20% RH and a humidity of 80% RH from a nitrogen atmosphere to measure the length of the sample and calculate its humidity expansion coefficient from the following equation.

$$\alpha h = \{(L_2-L_1) \times 10^{-6}/(L_1 \times \Delta H)\}$$

wherein $L_1$ is the length (mm) of the sample at a humidity of 20% RH, $L_2$ is the length (mm) of the sample at a humidity of 80% RH, and ΔH is 60 (=80−20% RH).

(5) Thermal Shrinkage Factor

The film sample cut to a length of 300 mm and a width of 10 mm in the transverse direction is placed in an oven heated at 105° C. under no load, heated for 30 minutes, taken out from the oven and cooled to room temperature to read its dimensional change. The thermal shrinkage factor of the film sample is calculated from its length ($L_0$) before the heat treatment and a dimensional change (ΔL) by the heat treatment based on the following equation.

$$\text{thermal shrinkage factor} = (\Delta L/L_0) \times 100 (\%)$$

In the case of elongation, ΔL is a negative value.

(6) Refractive Index

The refractive indices in longitudinal and transverse directions of the film are measured at 25° C. using an Abbe refractometer (of Atago Co., Ltd.) and Na-D rays. Both the front and rear sides of the film sample are measured and the average value of the measurement data is taken as refractive index.

(7) Dimensional Change in Crosswise Direction Under Load in Longitudinal Direction at the Time of High-Temperature and High-Humidity Treatment The film slit to a width of 12.65 mm (½ inch) is set as shown in FIG. 1 at an ambient temperature of 23° C. and an ambient humidity of 50% RH.

In FIG. 1, the numerals represent the following.
1 measurement sample
2 light emitting portion of an optical sensor (LS-3036 of Keyence Co., Ltd.)
3 light receiving portion of an optical sensor (LS-3036 of Keyence Co., Ltd.)
4 load
5 free roll
6 glass plate
7 measuring instrument (LS-3100 of Keyence Co., Ltd.)
8 analog/digital converter
9 personal computer
10 laser beam Gold has been deposited on the surface of the sample slit to a width of 12.65 mm by sputtering so that its width can be measured with a detector. In this state, a weight of 29 MPa per the sectional area of the film is attached to one side of the film (the other side is fixed) to measure the width ($L_1$) of the film with the laser outer diameter measuring instrument of Keyence Co., Ltd. (body: model 3100, sensor: model 3060).

Thereafter, a weight of 29 MPa per the sectional area of the film is attached to one side of the film (the other side is fixed) at a temperature of 49° C. (120° F.) and a humidity of 90% RH, kept in this state for 72 hours (3 days) and removed, and the film was kept at an ambient temperature of 23° C. and an ambient humidity of 50% for 24 hours. Then, a weight of 29 MPa per the sectional area of the film is attached to one side of the film (the other side is fixed) again to measure the width ($L_2$) of the film with the laser outer diameter measuring instrument of Keyence Co., Ltd. (body: model 3100, sensor: model 3060).

The dimensional change in the crosswise direction (αW) before and after the temperature and humidity treatment under load is calculated from the above measured sizes before and after the temperature and humidity treatment based on the following equation.

$$\alpha W = \{(L_2 - L_1)/L_1\} \times 100(\%)$$

The evaluation criteria are as follows.

(8) Track Dislocation (Error Rate)

The error rate is measured under the following conditions using the ML4500B QIC system of Media Logic Co., Ltd.
Current: 15.42 mA
Frequency: 0.25 MHz
Location: 0
Threshold: 40.0
Bad/good/max: 1:1:1
Tracks: 28

The error rate is the average value of the number of measured tracks.

The error rate is measured under condition 1 (track dislocation caused by temperature and humidity variations) and under condition 2 (track dislocation caused by a temperature and humidity treatment) as follows. condition 1 (track dislocation caused by temperature and humidity variations):

A tape which recorded data at 10° C. and 10% RH is reproduced at a temperature of 45° C. and a humidity of 80% RH to measure the amount of track dislocation caused by temperature and humidity variations. The measurement result is evaluated based on the amount of track dislocation of the sample of Example 1 according to the following criteria.

◎: error rate is zero
○: error rate is low and there is no practical problem
X: error rate is high and there is a practical problem
condition 2 (track dislocation caused by temperature and humidity treatment)

A tape which recorded data at 23° C. and 50% RH is caused to run at 40° C. and 60% RH repeatedly for 60 hours and then kept at 23° C. and 50% RH for 24 hours, and then data is reproduced at 23° C. and 50% RH to measure the amount of track dislocation caused by a temperature and humidity treatment.

The measurement result is evaluated based on the amount of track dislocation of the sample of Example 1 according to the following criteria.

◎: error rate is zero
○: error rate is low and there is no practical problem
X: error rate is high and there is a practical problem (9) Electromagnetic Conversion Characteristics of Magnetic Tape The electromagnetic conversion characteristics of a magnetic tape are measured with the ML4500B QIC system of Media Logic Co., Ltd. The measurement result is evaluated based on the following criteria when the S/N of the sample of Example 1 is 0 dB.

◎: +1 dB or more
○: −1 dB or more and less than +1 dB
X: less than −1 dB

Example 1

Polyethylene-2,6-naphthalate (intrinsic viscosity: 0.6) containing 0.02 wt % of calcium carbonate particles having an average particle diameter of 0.6 μm and 0.2 wt % of silica particles having an average particle diameter of 0.1 μm was dried at 180° C. for 5 hours, melt extruded at 300° C. and solidified by quenching on a casting drum maintained at 60° C. to obtain an unstretched film.

This unstretched film was stretched to 6.2 times in a longitudinal direction between two rolls having different speeds at 150° C. The uniaxially oriented film after longitudinal stretching had a refractive index in the longitudinal direction of more than 1.77, an refractive index in the transverse direction of 1.587 and a refractive index in the thickness direction of 1.534. This uniaxially oriented film was stretched to 4.5 times in the transverse direction at a draw rate of 87.5%/sec while the temperature was raised to 120 to 155° C. in the traveling direction of the film, further stretched to 1.1 times in the transverse direction again at a draw rate of 2.9%/sec while the temperature was raised to 155 to 205° C. in the traveling direction of the film and heat set at 190° C. in the final heat setting zone for 5 seconds while it was toed out by 5% (1.05 times). The obtained biaxially oriented film had a thickness of 4.5 μm.

The following composition was placed in a ball mill and kneaded for 16 hours to be dispersed, and 5 parts by weight of an isocyanate compound (Desmodule L of Bayer AG) was added and dispersed by high-speed shearing for 1 hour to prepare a magnetic coating.

| composition of magnetic coating: | |
|---|---|
| needle-like Fe particle | 100 parts by weight |
| vinyl chloride-vinyl acetate copolymer (Eslec 7A of Sekisui Chemical Co., Ltd.) | 15 parts by weight |
| thermoplastic polyurethane resin | 5 parts by weight |
| chromium oxide | 5 parts by weight |
| carbon black | 5 parts by weight |
| lecithin | 2 parts by weight |
| fatty acid ester | 1 part by weight |
| toluene | 50 parts by weight |
| methyl ethyl ketone | 50 parts by weight |
| cyclohexanone | 50 parts by weight |

This magnetic coating was applied to one side of the above biaxially oriented PEN film to ensure that the final thickness of the coating layer should become 0.5 μm, and the obtained film was oriented in 2,500 Gauss of a DC magnetic field, dried by heating at 100° C., supercalendered (linear pressure of 200 kg/cm, temperature of 80° C.) and rolled. This roll was left in an oven heated at 55° C. for 3 days.

The following back coat was applied to the other side of the biaxially oriented PEN film to ensure that the thickness of the coat should become 1 μm, and the obtained film was dried and cut to obtain a magnetic tape.

| composition of back coat | |
|---|---|
| carbon black | 100 parts by weight |
| thermoplastic polyurethane resin | 60 parts by weight |

-continued

| composition of back coat | |
|---|---|
| isocyanate compound (Colonate L of Nippon Polyurethane Kogyo Co., Ltd.) | 18 parts by weight |
| silicone oil | 0.5 part by weight |
| methyl ethyl ketone | 250 parts by weight |
| toluene | 50 parts by weight |

The characteristic properties of the thus obtained film and magnetic tape are shown in Table 1. As obvious from Table 1, the obtained tape had excellent dimensional stability in the crosswise direction (temperature and humidity variations and high-temperature and high-humidity treatment under load in longitudinal direction) and excellent output characteristics and was free from track dislocation.

Example 2

The film was stretched to 6.2 times in the longitudinal direction at 150° C. in Example 1. After longitudinal stretching, the uniaxially oriented film had a refractive index in the longitudinal direction of more than 1.77, a refractive index in the transverse direction of 1.587 and a refractive index in the thickness direction of 1.534. This uniaxially oriented film was stretched to 4.2 times in the transverse direction at a draw rate of 80.0%/sec while the temperature was raised to 120 to 155° C. in the traveling direction of the film, further stretched to 1.20 times in the transverse direction again at a draw rate of 5.8%/sec while the temperature was raised to 155 to 205° C. in the traveling direction of the film, and heat set at 190° C. in the final heat setting zone for 5 seconds while it was toed in (0.95 time) by 5%. The obtained biaxially oriented film had a thickness of 4.5 μm.

A magnetic tape was obtained from the thus obtained film in the same manner as in Example 1. The characteristic properties of the film and magnetic tape are shown in Table 1. As obvious from Table 1, the obtained tape had excellent dimensional stability in the crosswise direction (temperature and humidity variations and high-temperature and high-humidity treatment under load in longitudinal direction) and excellent output characteristics and was free from track dislocation.

Example 3

Polyethylene-2,6-naphthalate (intrinsic viscosity: 0.6) for layer B which contained 0.15 wt % of crosslinked silicone resin particles having an average particle diameter of 0.3 μm and 0.15 wt % of spherical silica particles having an average particle diameter of 0.1 μm and polyethylene-2,6-naphthalate (intrinsic viscosity: 0.6) for layer A which contained 0.01 wt % of spherical silica particles having an average particle diameter of 0.1 μm were prepared, and pellets of these polyethylene-2,6-naphthalates were dried at 180° C. for 5 hours, supplied to the respective hoppers of two extruders, molten at a temperature of 300° C., laminated together using a multi-manifold coextrusion die in such a manner that the layer A was placed on one side of the layer B, and extruded onto a casting drum having a surface finish of about 0.3 S and a surface temperature of 60° C. to obtain an unstretched laminated film. The thickness of each layer was adjusted by the delivery rates of the two extruders to achieve surface roughness shown in Table 1.

This unstretched film was stretched to 6.0 times in the longitudinal direction between two rolls having different speeds at 150° C. After longitudinal stretching, the uniaxially oriented film had a refractive index in the longitudinal direction of more than 1.77, a refractive index in the transverse direction of 1.587 and a refractive index in the thickness direction of 1.536. This uniaxially oriented film was stretched to 4.8 times in the transverse direction at a draw rate of 95.0%/sec while the temperature was raised to 120 to 155° C. in the traveling direction of the film, further stretched to 1.15 times in the transverse direction again at a draw rate of 4.4%/sec while the temperature was raised to 155 to 205° C. in the traveling direction of the film and heat set at 190° C. in the final heat setting zone for 5 seconds by making the rails straight (1.00 time). The obtained biaxially oriented film had a thickness of 4.5 μm.

A magnetic coating was applied to the surface of the layer A (magnetic layer side) and a back coat was applied to the surface of the layer B (non-magnetic layer side) in the same manner as in Example 1, dried and cut to obtain a magnetic tape.

The characteristic properties of the thus obtained film and magnetic tape are shown in Table 1. As obvious from Table 1, the obtained tape had excellent dimensional stability in the crosswise direction (temperature and humidity variations and high-temperature and high-humidity treatment under load in longitudinal direction) and excellent output characteristics and was free from track dislocation.

Comparative Example 1

The film was stretched to 6.2 times in the longitudinal direction at 150° C. in Example 1. After longitudinal stretching, the uniaxially oriented film had a refractive index in the longitudinal direction of more than 1.77, a refractive index in the transverse direction of 1.587 and a refractive index in the thickness direction of 1.534. This uniaxially oriented film was stretched to 2.6 times in the transverse direction at a draw rate of 40.0%/sec while the temperature was raised to 120 to 155° C. in the traveling direction of the film, further stretched to 2.00 times in the transverse direction again at a draw rate of 29.2%/sec while the temperature was raised to 155 to 205° C. in the traveling direction of the film and heat set at 190° C. in the final heat setting zone for 5 seconds by making the rails straight (1.00 time). Since the film was often broken by the second transverse stretching, a roll sample could not be obtained.

Comparative Example 2

The film was stretched to 6.0 times in the longitudinal direction at 150° C. in Example 1. After longitudinal stretching, the uniaxially oriented film had a refractive index in the longitudinal direction of more than 1.77, a refractive index in the transverse direction of 1.587 and a refractive index in the thickness direction of 1.536. This uniaxially oriented film was stretched to 5.5 times in the transverse direction at a draw rate of 112.5%/sec while the temperature was raised to 120 to 155° C. in the traveling direction of the film, the rails were made straight (1.00 time) while the temperature was raised to 155 to 205° C. in the traveling direction of the film, and the film was further heat set at 190° C. in the final heat setting zone for 5 seconds by making the rails straight (1.00 time). Since the film was often broken by the first transverse stretching, a roll sample could not be obtained.

Comparative Example 3

The film was stretched to 6.2 times in the longitudinal direction at 150° C. in Example 1. After longitudinal stretching, the uniaxially oriented film had a refractive index in the longitudinal direction of more than 1.77, a refractive index in the transverse direction of 1.587 and a refractive index in the thickness direction of 1.534. This uniaxially oriented film was stretched to 4.3 times in the transverse direction at a draw rate of 82.5%/sec while the temperature was raised to 120 to 155° C. in the traveling direction of the film, further stretched to 1.10 times in the transverse direction again at a draw rate of 2.9%/sec while the temperature was raised to 155 to 205° C. in the traveling direction of the film and heat set at 190° C. in the final heat setting zone for 5 seconds while it was toed out by 10% (1.10 times). The obtained biaxially oriented film had a thickness of 4.5 μm.

A magnetic tape was obtained from the thus obtained film in the same manner as in Example 1. The characteristic properties of the film and magnetic tape are shown in Table 1. As obvious from Table 1, the obtained film had a large thermal shrinkage factor in the transverse direction and poor dimensional stability in the crosswise direction of the tape (high-temperature and high-humidity treatment under load in longitudinal direction).

Comparative Example 4

The film was stretched to 5.7 times in the longitudinal direction at 150° C. in Example 1. After longitudinal stretching, the uniaxially oriented film had a refractive index in the longitudinal direction of more than 1.77, a refractive index in the transverse direction of 1.587 and a refractive index in the thickness direction of 1.539. This uniaxially oriented film was stretched to 3.9 times in the transverse direction at a draw rate of 72.5%/sec while the temperature was raised to 120 to 155° C. in the traveling direction of the film, the rails were made straight (1.00 time) while the temperature was raised to 155 to 205° C. in the traveling direction of the film, and the film was further heat set at 190° C. in the final heat setting zone for 5 seconds by making the rails straight (1.00 time). The obtained biaxially oriented film had a thickness of 4.5 μm.

A magnetic tape was obtained from the thus obtained film in the same manner as in Example 1. The characteristic properties of the film and magnetic tape are shown in Table 1. As obvious from Table 1, the obtained film had a low Young's modulus in the transverse direction and poor dimensional stability in the crosswise direction of the tape (temperature and humidity variations).

Comparative Example 5

The film was stretched to 4.0 times in the longitudinal direction at 150° C. in Example 1. After longitudinal stretching, the uniaxially oriented film had a refractive index in the longitudinal direction of more than 1.77, a refractive index in the transverse direction of 1.587 and a refractive index in the thickness direction of 1.558. This uniaxially oriented film was stretched to 5.4 times in the transverse direction at a draw rate of 110.0%/sec while the temperature was raised to 120 to 155° C. in the traveling direction of the film, the rails were made straight (1.00 time) while the temperature was raised to 155 to 205° C. in the traveling direction of the film, and the film was further heat set at 190° C. in the final heat setting zone for 5 seconds by making the rails straight (1.00 time). The obtained biaxially oriented film had a thickness of 4.5 μm.

A magnetic tape was obtained from the thus obtained film in the same manner as in Example 1. The characteristic properties of the film and magnetic tape are shown in Table 1. As obvious from Table 1, the obtained film had a low Young's modulus in the transverse direction and poor dimensional stability in the crosswise direction of the tape (high-temperature and high-humidity treatment under load in longitudinal direction).

TABLE 1

| Item | unit | Ex. 1 | Ex. 2 | Ex. 3 | C. Ex. 1 | C. Ex. 2 | C. Ex. 3 | C. Ex. 4 | C. Ex. 5 |
|---|---|---|---|---|---|---|---|---|---|
| layer structure | | single layer | single layer | double layers | single layer | single layer | single layer | single layer | single layer |
| film forming conditions | | | | | | | | | |
| draw ratio in longitudinal direction | times | 6.2 | 6.2 | 6.0 | 6.2 | 6.0 | 6.2 | 5.7 | 4.0 |
| draw ratio in transverse direction | | | | | | | | | |
| first draw ratio (SD1) | times | 4.5 | 4.2 | 4.8 | 2.6 | 5.5 | 4.3 | 3.9 | 5.4 |
| second draw ratio (SD2) | times | 1.10 | 1.20 | 1.15 | 2.00 | 1.00 | 1.10 | 1.00 | 1.00 |
| ratio in final heat setting zone (SD3) | times | 1.05 | 0.95 | 1.00 | 1.00 | 1.00 | 1.10 | 1.00 | 1.00 |
| total ratio (SD1 × SD2 × SD3) | times | 5.20 | 4.79 | 5.52 | 5.20 | 5.50 | 5.20 | 3.9 | 5.40 |
| draw rate | | | | | | | | | |
| first draw rate (S1) | %/sec | 87.5 | 80.0 | 95.0 | 40.0 | 112.5 | 82.5 | 72.5 | 110.0 |
| second draw rate (S2) | %/sec | 2.9 | 5.8 | 4.4 | 29.2 | 0.0 | 2.9 | 0.0 | 0.0 |
| S1/S2 | — | 0.03 | 0.07 | 0.05 | 0.73 | 0.00 | 0.04 | 0.00 | 0.00 |
| film formation state | | | | | | | | | |
| first transverse stretching zone | | | | | | | film is often broken | | |
| second transverse stretching zone | | | | | | film is often broken | | | |

TABLE 1-continued

| Item | unit | Ex. 1 | Ex. 2 | Ex. 3 | C. Ex. 1 | C. Ex. 2 | C. Ex. 3 | C. Ex. 4 | C. Ex. 5 |
|---|---|---|---|---|---|---|---|---|---|
| Physical properties | | | | | | | | | |
| Film thickness | μm | 4.5 | 4.5 | 4.5 | 4.5 | 4.5 | 4.5 | 4.5 | 4.5 |
| Young's modulus | | | | | | | | | |
| Longitudinal direction | GPa | 9.0 | 9.7 | 8.5 | 9.0 | 8.5 | 9.0 | 9.5 | 6.0 |
| Transverse direction | GPa | 7.0 | 6.5 | 7.5 | 7.0 | 7.5 | 7.0 | 5.5 | 9.0 |
| Refractive index in thickness direction (biaxially oriented film) | | 1.484 | 1.487 | 1.484 | 1.484 | 1.484 | 1.484 | 1.487 | 1.487 |
| Temperature expansion coefficient ($\alpha t$) | | | | | | | | | |
| Transverse direction | $\times 10^{-6}/°C$ | 3 | 8 | 0 | 3 | 0 | 3 | 17 | −5 |
| Humidity expansion coefficient ($\alpha h$) | | | | | | | | | |
| Transverse direction | $\times 10^{-6}/\%RH$ | 12 | 13 | 10 | 12 | 10 | 12 | 16 | 8 |
| 105° C. thermal shrinkage factor | | | | | | | | | |
| transverse direction | % | 1.3 | 0.3 | 0.8 | 2.3 | 0.5 | 1.8 | 0.3 | 0.3 |
| dimensional change in crosswise direction under load in longitudinal direction caused by high-temperature and high-humidity treatment | % | 0.20 | 0.17 | 0.22 | 0.20 | 0.22 | 0.20 | 0.18 | 0.35 |
| surface roughness | | | | | | | | | |
| magnetic layer side (WRa) | nm | 6 | 6 | 2 | 6 | 6 | 6 | 6 | 6 |
| non-magnetic layer side | nm | 6 | 6 | 8 | 6 | 6 | 6 | 6 | 6 |
| track dislocation | | | | | | | | | |
| condition 1 (track dislocation caused by temperature and humidity variations) | | ⊙ | ○ | ⊙ | — | — | ⊙ | X | ⊙ |
| condition 2 (track dislocation caused by temperature and humidity variations) | | ○ | ⊙ | ○ | — | — | X | ⊙ | X |
| electromagnetic conversion characteristics | | ○ | ○ | ⊙ | — | — | ○ | ○ | ○ |

Ex.: Example
C. Ex.: Comparative Example

The invention claimed is:

1. A biaxially oriented polyester film having (i) a Young's modulus in a longitudinal direction of 8 to 12 GPa, (ii) a Young's modulus in a transverse direction of 6.5 to 9 GPa, (iii) a temperature expansion coefficient in the transverse direction ($\alpha t$) of $-5 \times 10^{-6}/°C$. to $+12 \times 10^{-6}/°C$., (iv) a humidity expansion coefficient in the transverse direction ($\alpha h$) of $+6 \times 10^{-6}/\%RH$ to $+12 \times 10^{-6}/\%RH$ and (v) a thermal shrinkage factor at 105° C. in the transverse direction of 0 to +1.5% and comprising (vi) ethylene-2,6-naphthalene dicarboxylate in an amount of at least 95 mol % of the total of all the recurring units.

2. The film of claim 1 which has a total of Young's moduli in the longitudinal and transverse directions of 15 to 20 GPa.

3. The film of claim 1 which has a higher Young's modulus in the longitudinal direction than a Young's modulus in the transverse direction.

4. The film of claim 1 which has a refractive index in a thickness direction (Nz) of less than 1.490.

5. The film of claim 1 which has a center plane average roughness (WRa) of at least one side of 0.5 to 10 nm.

6. The film of claim 1 which is a laminate comprising two layers of a polyester comprising ethylene-2,6-naphthalene dicarboxylate in an amount of at least 95 mol % of the total of all the recurring units and has a center plane average roughness (WRa) of one side of 0.5 to 10 nm and a WRa of the other side of 1 to 20 nm.

7. A magnetic recording medium comprising the biaxially oriented polyester film of claim 1 as a base film.

8. The magnetic recording medium of claim 7 which is a digital recording medium of a linear recording system.

9. The magnetic recording medium of claim 7 which is a coated magnetic recording medium.

10. The magnetic recording medium of claim 7 which is a ferromagnetic metal thin film magnetic recording medium.

11. A magnetic recording medium comprising the biaxially oriented polyester film of claim 1 and a magnetic layer formed on the surface of the film.

* * * * *